United States Patent [19]

Doucet et al.

[11] Patent Number: 5,281,648

[45] Date of Patent: * Jan. 25, 1994

[54] FLAME-RETARDED ABS FORMULATIONS WITH HIGH IMPACT STRENGTH

[75] Inventors: David K. Doucet; Janet F. Jones; Susan D. Landry; F. Alexander Pettigrew; Jon S. Reed; James E. Torres, all of Baton Rouge, La.

[73] Assignee: Ethyl Corporation, Richmond, Va.

[*] Notice: The portion of the term of this patent subsequent to Jun. 8, 2010 has been disclaimed.

[21] Appl. No.: 923,511

[22] Filed: Aug. 3, 1992

Related U.S. Application Data

[63] Continuation-in-part of Ser. No. 744,873, Aug. 14, 1991, Pat. No. 5,218,017.

[51] Int. Cl.$^5$ .......................... C08J 5/10; C08K 3/10; C08K 3/16; C08L 55/02
[52] U.S. Cl. .................................. 524/411; 524/409; 524/412; 524/430; 524/467; 524/505; 525/72; 525/148; 525/288
[58] Field of Search ............... 524/409, 411, 412, 430, 524/467, 505; 525/72, 148, 288

[56] References Cited

U.S. PATENT DOCUMENTS

| | | | |
|---|---|---|---|
| 4,067,930 | 1/1978 | Versnel et al. | 260/880 R |
| 4,130,605 | 12/1978 | Barkhuff, Jr. | 260/876 R |
| 4,150,066 | 4/1979 | Kudo et al. | 260/876 R |
| 4,639,486 | 1/1987 | Liu | 524/409 |
| 4,751,260 | 6/1988 | Kress et al. | 524/130 |
| 5,036,126 | 7/1991 | Rinehart et al. | 524/141 |
| 5,059,650 | 10/1991 | Goettsch et al. | 524/412 |

FOREIGN PATENT DOCUMENTS 1095143A 10/1987 Japan.

Primary Examiner—Paul R. Michl
Assistant Examiner—U. K. Rajguru
Attorney, Agent, or Firm—David E. LaRose

[57] ABSTRACT

The impact strength of articles made from a flame-retarded formulated ABS resin containing an impact modifier is increased by forming a concentrate or masterbatch containing the flame retardant and impact modifier, blending the concentrate with ABS resin and extruding the resultant blend.

22 Claims, No Drawings

FLAME-RETARDED ABS FORMULATIONS WITH HIGH IMPACT STRENGTH

This application is a continuation-in-part of copending application Ser. No. 744,873 filed on Aug. 14, 1991.

This invention is in the field of thermoplastic synthetic resin formulations, especially ABS (acrylonitrile-butadiene-styrene) resins flame-retarded with at least one brominated organic flame retardant, as well as a method for producing the formulations.

BACKGROUND

ABS resins are well known in the synthetic organic polymer art as a class of thermoplastics which offers excellent mechanical properties as well as good processability and chemical resistance. The general characteristics of ABS resins are described, for example, in "Modern Plastics Encyclopedia," McGraw-Hill, New York, N.Y., 1990, pp 90-91. ABS resins are co- or terpolymers which generally comprise a rigid styrene/acrylonitrile continuous phase in combination with a polybutadiene elastomer disperse phase. A graft copolymer in which small amounts of styrene and acrylonitrile are grafted onto butadiene chains may also be present to bridge the rigid phase and the elastomer phase and make them more compatible.

For purposes of the instant invention, an ABS resin is a thermoplastic, the chemical structure of which includes each of the following structural units, however combined:

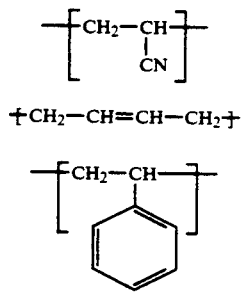

Further, a formulated ABS resin, for all purposes herein, comprises at least about 50 wt % ABS resin. The remainder of the formulated ABS resin comprises various monomeric or polymeric additives which modify the properties of the ABS resin. These additives include, for example, various impact modifiers, stabilizers, processing aids, pigments, flame retardants, synergists, etc. They can be incorporated into the ABS resin in various ways.

Incorporation of the various additives is not a trivial matter, and the properties of the formulated ABS resin can be affected by the manner in which it is done. When the additives are solids, dry-blending can be employed. For example, the solids can be mixed and heated to soften and homogenize the mass, which can then be sheeted, chopped, and pelletized.

A flame retardant, such as a halogenated organic compound, is often incorporated into a formulated ABS resin so as to constitute as much as about 25-30 wt % of the formulation. Such incorporation can adversely affect the properties, other than the flammability, of the formulated ABS resin. For example, a flame retardant having a high melting point range, such as decabromodiphenylethane, or decabromodiphenyl oxide will have a filler type effect on the ABS resin formulation, whereas a flame retardant having a lower melting point range will have a plasticizer effect on the formulation. Because of the effect flame retardants have on articles containing such ABS resin formulations, improvements in such formulations and formulation techniques are highly desirable and of significant commercial importance.

SUMMARY OF THE INVENTION

Consequently, it is one object of this invention to provide a formulated ABS resin in which a halogenated organic flame retardant is incorporated and an impact-modifying polymer is added so as to provide a significant net increase in the impact strength of articles prepared from ABS resin the formulation. It is another objective to build on this improvement by providing a method for incorporating the flame retardant which leads to a still further increase in the impact strength.

In attaining the aforesaid objectives, this invention provides a flame-retarded ABS formulation which comprises at least about 50 wt % ABS resin, about 5-30 wt % halogenated flame retardant, about 8-38 wt % polymeric impact modifier, and optionally, about 0-6 wt % flame retardant synergist. In preferred embodiments, the polymeric impact modifier is selected, and the flame retardant is incorporated in the flame-retarded ABS formulation by forming a concentrate or masterbatch containing the flame retardant, impact modifier, and optionally, other additives; dry blending the concentrate with the ABS resin; and extruding the resultant blend thereby forming a formulated ABS resin which will provide enhanced IZOD impact strength as determined by ASTM D 256-88 to articles made from the ABS resin formulation. It has been found surprisingly, and quite unexpectedly, that the IZOD impact strength of articles containing the ABS resin formulation of this invention when prepared according to the method described herein is dramatically increased over articles prepared from a ABS formulation in which the flame retardant, impact modifier, ABS resin, and optional flame retardant synergist are combined without initially forming a concentrate or masterbatch of flame retardant and impact modifier.

For the purposes of this invention, the terms "concentrate", "masterbatch", and "masterbatching" refer to a homogeneous blend comprising flame retardant and impact modifier, and optionally, other additives, provided the other additives do not adversely affect the IZOD impact strength of articles prepared from the formulated ABS resin. It is of course understood, that such a concentrate or masterbatch may also contain a minor amount of ABS resin sufficient to provide a homogeneous blend of the masterbatch components.

DETAILED DESCRIPTION

The ABS resin component of the formulated ABS can be selected from the many resins available in commerce. Such resins include GE Cycolac ® resins, Monsanto Lustran ® resins, and Dow Magnum ® resins, for example. The ABS resin component of the formulated ABS resin of this invention comprises at least about 50 wt % of the formulation, and the ABS resin can comprise as much as about 70 wt % of the formulation.

One of the additives which will be present in the formulated ABS resin of this invention is one or more flame retardants, and halogenated flame retardants have been recommended and employed in that application. Halogenated flame retardants especially useful in the practice of this invention are selected from the group consisting of tetrahalobisphenol A, N,N'-bis(tetrahalophthalimide), N,N'-ethylenebis(tetrahalophthalimide), halogenated polystyrene, and pentahalobenzyl acrylate, in all of which halo is selected from chloro and bromo, and also bis-halophenyl compounds represented by the following structural formula which are solids at ambient temperature:

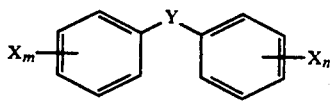

in which formula each X is selected independently from chlorine and bromine; m and n can be the same or different and can range from 1 to 5; Y is selected from oxygen, alkylene, —NR— (where R is selected from hydrogen and hydrocarbyl), alkylenedioxy, aryldioxy, and a chemical bond. Alkylene is preferably lower alkylene, i.e., straight chain or branched $C_1$–$C_6$, such as methylene, ethylene, isopropylene, butylene, t-butylene, and the like, methylene or ethylene being preferred. Hydrocarbyl includes alkylene, especially lower alkylene, but also unsaturated alkylene and aromatic groups such as phenyl and alkylphenyl or halophenyl. Alkylenedioxy includes methylenedioxy, 1,2-dioxyethylene, and the like, while aryldioxy includes dioxyphenyl, for example. In the preferred flame retardants halo and X are bromo. Among the aforesaid flame retardants, the bishalophenyl compounds are preferred, and among these compounds, decabromodiphenyl oxide, decabromodiphenyl ethane, 1,2-bis(tribromophenoxy)ethane, and decabromodiphenyl amine are especially attractive.

In addition to one or more halogenated flame retardants, the formulated ABS resin of this invention optionally includes a flame retardant synergist in an amount ranging from about 2 to about 6 wt %. A number of materials, such as metal oxides, e.g., iron oxide, tin oxide, zinc oxide, aluminum trioxide, alumina, antimony tri- and pentoxide, and boron compounds, e.g., zinc borate; also antimony silicates and ferrocene, are known to enhance the effectiveness of flame retardants, especially halogenated flame retardants. A particularly effective and preferred synergist is antimony trioxide. The flame retardant synergist can be combined with the flame retardant and impact modifier in the concentrate or masterbatch, or the synergist can be admixed with the ABS resin component of the formulation.

In addition to flame retardant, the formulated ABS resin of this invention includes one or more polymeric impact modifiers. It is well known that the addition of certain materials to an ABS resin tends to toughen articles molded therefrom. Among these materials are styrene/butadiene/styrene triblock copolymer, styrene/isoprene/styrene triblock copolymer, styrene/butadiene diblock copolymer, polycaprolactone, functionalized ethylene/propylene copolymers, and poly(-halo-olefins). A preferred impact-modifying material is a halogenated polyolefin resin, such as chlorinated polyethylene.

The concentrate or masterbatch of this invention can be formed by conventional techniques such as by combining, either continuously or batchwise, the flame retardant, impact modifier, and optional additives in a stirred kettle, drum mixer, mixing tube, mechanical high-intensity mixer, kneader, or extruder whereby a homogeneous blend of the concentrate or masterbatch is obtained. It will of course be recognized that only those innocuous ingredients which do not adversely affect the IZOD impact strength of articles made from the fully formulated ABS resin will be included in the concentrate or masterbatch. Such a determination can be made empirically by simple trial and error techniques. Accordingly, the optional additives may be selected from flame retardant synergists, pigments, thermal stabilizers, plasticizers, antistatic agents, ultraviolet stabilizers, blowing agents, fillers, reinforcing rubbers, and the like.

The temperature for forming the concentrate or masterbatch of this invention is not critical, provided the temperature is low enough to avoid thermal degradation of the concentrate, yet high enough to provide a homogeneous blend of the concentrate's components. Those skilled in the art can readily determine suitable processing temperatures.

After forming the concentrate or masterbatch, the concentrate is combined with the ABS resin to form the flame retardant ABS formulation. Such a combination can be obtained by the use of a single or twin screw extruder, a high intensity mixer, or a continuous mixer. It is understood of course, that when an extruder is used, the concentrate and the ABS resin may be combined and fed to the extruder, or the concentrate and ABS resin may be fed to the extruder separately.

A typical formulated ABS resin containing chlorinated polyethylene and a brominated flame retardant, in addition to the ABS resin, is described in Example 1.

EXAMPLE 1

A. The components indicated in column A, Table 1 were dry-blended by shaking them together for 2 min in a plastic bag. The mixture was then extruded on a Haake-Buchler System 40 Rheometer equipped with a twin-screw extruder head. The extrusion was carried out at 210°-210°-220°-220° C. and 60 rpm. The extruded material was pelletized and dried at 88° C. for 4 hr before injection molding it on a Battenfeld BSKM 100/40 machine at 195° C. and testing for IZOD impact strength according to ASTM D 256-88.

B. The components indicated in column B, Table 1 were combined as follows: The flame retardant, chlorinated polyethylene, processing aid, and one-half the stabilizer were blended in a Brabender mixer at 175° C. and 66 rpm for 2 min. The resultant blend was sheeted on a two-roll mill and chopped into small pieces on a Glouster grinder, affording a masterbatch. An amount of the masterblend appropriate to the desired composition was dry-blended with the remaining ingredients. The combination was then extruded, pelletized, dried, and molded as described in A above. The IZOD impact strength of the extruded materials was measured on ⅛ in. test bars according to the ASTM D 256-88 test method.

TABLE 1

| Component | A (wt %) | B (wt %) |
|---|---|---|
| ABS Resin (Dow Magnum ® PG-914) | 69.9 | 68.9 |
| Impact Modifier; Polychloroethylene (Tyrin ® 3611 of Dow Chemical Co.) | 13.1 | 13.1$^a$ |
| Flame Retardant; Decabromodiphenylethane | 12.5 | 12.5$^a$ |

TABLE 1-continued

| Component | A (wt %) | B (wt %) |
|---|---|---|
| (Ethyl Corp.) | | |
| Synergist; Sb$_2$O$_3$ | 4.0 | 4.0 |
| Processing Aid; Zinc Stearate | 0.5[a] | |
| Stabilizer; Dibutyltin Maleate (Thermolite ® 13 of Atochem No. Am.) | 0.5 | 1.0[a] |
| IZOD Impact Strength (ft-lb/in notch) (ASTM D 256-88) | 3.6 ± 0.1 | 3.6 ± 0.1 |

[a] component of masterbatch

The data in Example 1 show that masterbatching per se has little or no effect on impact strength of the resultant formulated ABS resin. The effect on IZOD impact strength of including a second impact-modifying resin; more specifically, a styrene/butadiene/styrene block copolymer is set forth in Example 2.

EXAMPLE 2

A. The components indicated in column A, Table 2 were combined as explained in Example 1 A.

B. The components indicated in column B, Table 2 were combined as explained in Example 1 B.

TABLE 2

| Component | A (wt %) | B (wt %) |
|---|---|---|
| ABS Resin (Dow Magnum ® PG-914) | 64.9 | 63.9 |
| Impact Modifier; Polychloroethylene (Tyrin ® 3611 of Dow Chemical Co.) | 13.1 | 13.1[a] |
| Impact Modifier; Styr/But/Styr Block Copolymer (Shell Kraton ® D1102) | 5.0 | 5.0[a] |
| Flame Retardant; Decabromodiphenylethane (Ethyl Corp.) | 12.5 | 12.5[a] |
| Synergist; Sb$_2$O$_3$ | 4.0 | 4.0 |
| Processing Aid; Zinc Stearate | | 0.5[a] |
| Stabilizer; Dibutyltin Maleate (Thermolite ® 13 of Atochem No. Am.) | 0.5 | 1.0[a] |
| IZOD Impact Strength (ft-lb/in notch) (ASTM D 256-88) | 4.8 ± 0.2 | 9.0 ± 0.4 |

[a] component of masterbatch

The data in Example 2 illustrate the improvement in IZOD impact strength of test bars made from the formulated ABS resin brought about by replacing some of the ABS resin with a styrene/butadiene/styrene block copolymer; i.e., an increase in the IZOD impact strength from 3.6±0.1 in Ex. 1 A to 4.8±0.2 ft-lb/in notch. Moreover, the data illustrate the surprising increase in IZOD impact strength which occurs when the styrene/butadiene/styrene block copolymer is part of the masterbatched ingredients; i.e, from 4.8±0.2 to 9.0±0.4 ft-lb/in notch.

In Example 3, the effects of removing the impact-modifying resins, one at a time, from the masterbatch is illustrated.

EXAMPLE 3

In both A and B the components were combined as explained in Example 1 B.

TABLE 3

| Component | A (wt %) | B (wt %) |
|---|---|---|
| ABS Resin (Dow Magnum ® PG-914) | 63.9 | 63.9 |
| Impact Modifier; Polychloroethylene (Tyrin ® 3611 of Dow Chemical Co.) | 13.1[a] | 13.1 |
| Impact Modifier; Styr/But/Styr Block Copolymer (Shell Kraton ® D1102) | 5.0 | 5.0[a] |
| Flame Retardant; Decabromodiphenylethane (Ethyl Corp.) | 12.5[a] | 12.5[a] |
| Synergist; Sb$_2$O$_3$ | 4.0 | 4.0 |
| Processing Aid; Zinc Stearate | 0.5[a] | 0.5[a] |
| Stabilizer; Dibutyltin Maleate (Thermolite ® 13 of Atochem No. Am.) | 1.0[a] | 1.0[a] |
| IZOD Impact Strength (ft-lb/in notch) (ASTM D 256-88) | 5.8 ± 0.2 | 7.6 ± 0.3 |

[a] component of masterbatch

When the components were combined without masterbatching, i.e., Example 2 A, the IZOD impact strength was 4.8±0.2 ft-lb/in notch. Although excluding either impact-modifier resin from the masterbatch affects IZOD impact strength adversely, this affect is most pronounced when the styrene/butadiene/styrene block copolymer is left out of the masterbatch.

It will be evident to those skilled in the art that considerable variation in the specific nature and relative amounts of the components of the formulated ABS resin of this invention, as well as in the manner in which those components are combined is possible within the contemplation of this invention and that the invention is limited only by reference to the following claims:

What is claimed is:

1. A flame-retarded ABS resin formulation which provides enhanced impact resistance to articles made from such ABS resin formulation comprising
   a) a blend of (i) about 5–30 wt. % halogenated flame retardant, (ii) about 8–38 wt. % polymeric impact modifier, and (iii) a synergistic amount of flame retardant synergist; and
   b) at least about 50 wt. % ABS resin; whereby test bars made from the ABS resin formulation have an enhanced IZOD impact strength as determined by ASTM D 256-88 which is greater than the IZOD impact strength of test bars made from an ABS resin formulation containing (a) (i), (a) (ii), (a) (iii), and (b) without initially forming the blend of (a) (i), (a) (ii), and (a) (iii), the weight percent of each constituent being based upon the total weight of the combination of (a) and (b).

2. The formulation of claim 1 wherein said polymeric impact modifier is selected from one or more of the group consisting of styrene/butadiene/styrene triblock copolymers, styrene/isoprene/ styrene triblock copolymers, styrene/butadiene diblock copolymers, polycaprolactone, functionalized ethylene/propylene copolymers, and poly(haloolefins).

3. The formulation of claim 2 wherein said polymeric impact modifier comprises polychloroethylene together with a styrene/ butadiene/styrene triblock copolymer.

4. The formulation of claim 1 wherein the blend contains up to about 6 wt. % flame retardant synergist based on the total weight of the ABS resin formulation.

5. The formulation of claim 4 wherein said flame retardant synergist is selected from one or more of the group consisting of metal oxides, hydroxides, and silicates, boron compounds, and ferrocene.

6. The formulation of claim 5 wherein said flame retardant synergist is antimony trioxide.

7. The formulation of claim 1 wherein said halogenated flame retardant is selected from one or more of tetrahalobisphenol A, N,N'-bis(tetrahalophthalimide), N,N'-ethylenebis(tetrahalophthalimide), halogenated polystyrene, pentahalobenzyl acrylate, and bis-halophenyl compounds of the structural formula

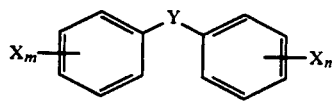

in which each X is selected independently from chlorine and bromine; m and n can be the same or different and can range from 1 to 5; and Y is selected from oxygen, alkylene, —NR— (where R is selected from hydrogen and hydrocarbyl), alkylenedioxy, aryldioxy, and a chemical bond.

8. The formulation of claim 7 wherein each X is bromine and m and n are 4 or 5.

9. The formulation of claim 7 wherein said flame retardant is selected from decabromodiphenyloxide, decabromodiphenylethane, 1,2-bis(tribromophenoxy)ethane, decabromodiphenyl amine, and pentabromobenzyl acrylate and mixtures thereof.

10. The formulation of claim 9 wherein said flame retardant is decabromodiphenylethane.

11. The formulation of claim 7 wherein said flame retardant is N,N'-ethylenebis(tetrabromophthalimide)

12. A method for enhancing the impact resistance of test bars made from a flame retarded formulated ABS resin which includes at least about 50 wt. % ABS resin, about 5-30 wt. % halogenated flame retardant, about 8-38 wt. % polymeric impact modifier, and a synergistic amount of flame retardant synergist, which method comprises forming a concentrate containing said flame retardant, polymeric impact modifier, and flame retardant synergist; dry blending said concentrate with said ABS resin; and extruding the resultant blend thereby forming said formulated ABS resin, wherein the weight percent of each constituent is based upon the total weight of the formulated ABS resin.

13. The method of claim 12 wherein said polymeric impact modifier is selected from one or more of the group consisting of styrene/butadiene/styrene triblock copolymers, styrene/isoprene/styrene triblock copolymers, styrene/butadiene diblock copolymers, polycaprolactone, functionalized ethylene/propylene copolymers, and poly(haloolefins).

14. The method of claim 13 wherein said polymeric impact modifier comprises polychloroethylene together with a styrene/butadiene/styrene triblock copolymer.

15. The method of claim 12 wherein said flame retardant synergist is selected from one or more of the group consisting of metal oxides, hydroxides, and silicates, boron compounds, and ferrocene.

16. The method of claim 15 wherein said flame retardant synergist is antimony trioxide.

17. The method of claim 12 wherein said halogenated flame retardant is selected from one or more of tetrahalobisphenol A, N,N'-bis(tetrahalophthalimide), N,N'-ethylenebis(tetrahalophthalimide), halogenated polystyrene, pentahalobenzyl acrylate, and bis-halophenyl compounds of the structural formula

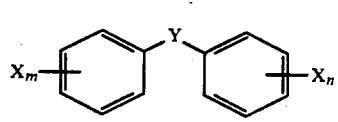

in which each X is selected independently from chlorine and bromine; m and n can be the same or different and can range from 1 to 5; and Y is selected from oxygen, alkylene, —NR— (where R is selected from hydrogen and hydrocarbyl), alkylenedioxy, aryldioxy, and a chemical bond.

18. The method of claim 17 wherein each X is bromine.

19. The method of claim 18 wherein m and n are 4 or 5.

20. The method of claim 17 wherein said flame retardant is selected from decabromodiphenyloxide, decabromodiphenylethane, 1,2-bis(tribromophenoxy)ethane, decabromodiphenyl amine, and pentabromobenzyl acrylate and mixtures thereof.

21. The method of claim 19 wherein said flame retardant is decabromodiphenylethane.

22. The method of claim 17 wherein said flame retardant is N, N'-ethylenebis(tetrahalophthalimide).

* * * * *